US009173059B2

(12) United States Patent
Zhu

(10) Patent No.: US 9,173,059 B2
(45) Date of Patent: *Oct. 27, 2015

(54) MOBILE INTERNET PROTOCOL (IP) LOCATION

(71) Applicant: TeleCommunication Systems, Inc., Annapolis, MD (US)

(72) Inventor: Yinjun Zhu, Sammamish, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/198,027

(22) Filed: Mar. 5, 2014

(65) Prior Publication Data

US 2014/0187265 A1 Jul. 3, 2014

Related U.S. Application Data

(63) Continuation of application No. 13/402,406, filed on Feb. 22, 2012, now Pat. No. 8,682,321.

(60) Provisional application No. 61/573,086, filed on Aug. 30, 2011, provisional application No. 61/457,316, filed on Feb. 25, 2011.

(51) Int. Cl.
*H04W 24/00* (2009.01)
*H04W 4/02* (2009.01)
(Continued)

(52) U.S. Cl.
CPC ........... *H04W 4/02* (2013.01); *H04L 29/12037* (2013.01); *H04L 61/609* (2013.01); *H04W 64/00* (2013.01); *H04L 61/2514* (2013.01); *H04L 61/605* (2013.01); *H04L 61/6054* (2013.01)

(58) Field of Classification Search
CPC ...................... H04L 29/12037; H04L 61/2514; H04L 61/605; H04L 61/6054; H04L 61/609; H04W 4/02; H04W 64/00

USPC ............. 455/456.2, 435.1, 456.1, 456.3, 458, 455/464; 370/466, 475
See application file for complete search history.

(56) References Cited

U.S. PATENT DOCUMENTS 1,103,073 A 7/1914 O'Connell
4,494,119 A 1/1985 Wimbush
(Continued)

FOREIGN PATENT DOCUMENTS

SE WO99/21380 4/1999
WO WO01/45342 6/2001
(Continued)

OTHER PUBLICATIONS

Le-Pond Chin, Jyh-Hong Wen, Ting-Way Liu, The Study of the Interconnection of GSM Mobile Communications Systems Over IP Based Network, May 6, 2001, IEEE, Vehicular Technology Conference, vol. 3, pp. 2219-2223.
(Continued)

*Primary Examiner* — Khai M Nguyen
(74) *Attorney, Agent, or Firm* — William H. Bollman

(57) ABSTRACT

A mobile IP location server that retrieves the location of a mobile device based on the public IP address that a mobile device is using. A mobile IP location server comprises a mobile location protocol interface, an identifier resolver, and a location manager. The mobile location protocol interface interacts with location applications and receives and responds to location requests. The identifier resolver converts a device's public IP address to a real mobile identifier (e.g. MSISDN) and performs address conversion by either interacting with an HTTP proxy server or querying a network address translation (NAT) table. The location manager retrieves the location of a mobile device given the device's real mobile identifier (e.g. MSISDN). A web application requests mobile IP location services by transmitting an IP request to the mobile IP location server. An IP location request contains a mobile device's public IP address, port number, and any application specific information.

22 Claims, 7 Drawing Sheets

(51) Int. Cl.
*H04W 64/00* (2009.01)
*H04L 29/12* (2006.01)

(56) References Cited

U.S. PATENT DOCUMENTS

| | | |
|---|---|---|
| 4,651,156 A | 3/1987 | Martinez |
| 4,706,275 A | 11/1987 | Kamil |
| 4,737,916 A | 4/1988 | Ogawa |
| 4,891,638 A | 1/1990 | Davis |
| 4,891,650 A | 1/1990 | Sheffer |
| 4,445,118 A | 5/1990 | Kuroda |
| 4,939,662 A | 7/1990 | Nimura |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicke |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimullah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,389,934 A | 2/1995 | Kass |
| 5,390,339 A | 2/1995 | Bruckert |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaugh |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,504,491 A | 4/1996 | Chapman |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,557,254 A | 9/1996 | Johnson |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,122 A | 6/1997 | Shah |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,684,951 A | 11/1997 | Goldman |
| 5,689,245 A | 11/1997 | Noreen |
| 5,689,269 A | 11/1997 | Norris |
| 5,689,809 A | 11/1997 | Grube |
| 5,699,053 A | 12/1997 | Jonsson |
| 5,717,688 A | 2/1998 | Belanger |
| 5,727,057 A | 3/1998 | Emery |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,774,824 A | 6/1998 | Streit |
| 5,787,357 A | 7/1998 | Salin |
| 5,794,142 A | 8/1998 | Vanttila |
| 5,797,094 A | 8/1998 | Houde |
| 5,797,096 A | 8/1998 | Lupien |
| 5,801,700 A | 9/1998 | Ferguson |
| 5,802,492 A | 9/1998 | DeLorme |
| 5,806,000 A | 9/1998 | Vo |
| 5,809,415 A | 9/1998 | Rossmann |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khue |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,920,821 A | 7/1999 | Seazholtz |
| 5,922,074 A | 7/1999 | Richard |

(56) References Cited

U.S. PATENT DOCUMENTS

| | | |
|---|---|---|
| 5,926,118 A | 7/1999 | Hayashida |
| 5,930,250 A | 7/1999 | Klok |
| 5,944,768 A | 8/1999 | Ito et al. |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,982,301 A | 11/1999 | Ohta |
| 5,983,099 A | 11/1999 | Yao |
| 5,983,109 A | 11/1999 | Montoya |
| 5,987,323 A | 11/1999 | Huotari |
| 5,998,111 A | 12/1999 | Abe |
| 5,999,124 A | 12/1999 | Sheynblat |
| 6,002,936 A | 12/1999 | Roel-Ng |
| 6,014,602 A | 1/2000 | Kithol |
| 6,032,051 A | 2/2000 | Hall |
| 6,035,025 A | 3/2000 | Hanson |
| 6,035,253 A | 3/2000 | Hayashi |
| 6,049,710 A | 4/2000 | Nilsson |
| 6,052,081 A | 4/2000 | Krasner |
| 6,058,300 A | 5/2000 | Hanson |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,091,957 A | 7/2000 | Larkins |
| 6,101,378 A | 8/2000 | Barabush |
| 6,108,533 A | 8/2000 | Brohoff |
| 6,115,611 A | 9/2000 | Kimoto |
| 6,122,503 A | 9/2000 | Daly |
| 6,122,520 A | 9/2000 | Want |
| 6,124,810 A | 9/2000 | Segal |
| 6,128,664 A | 10/2000 | Yanagidate |
| 6,131,067 A | 10/2000 | Girerd |
| 6,133,874 A | 10/2000 | Krasner |
| 6,134,316 A | 10/2000 | Kallioniemi |
| 6,134,483 A | 10/2000 | Vayanos |
| 6,138,003 A | 10/2000 | Kingdon |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,516 B1 | 1/2001 | Watanabe |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schneider |
| 6,178,506 B1 | 1/2001 | Quick, Jr. |
| 6,181,935 B1 | 1/2001 | Gossman |
| 6,181,939 B1 | 1/2001 | Ahvenainen |
| 6,182,006 B1 | 1/2001 | Meek |
| 6,182,227 B1 | 1/2001 | Blair |
| 6,185,426 B1 | 2/2001 | Alperovich |
| 6,188,354 B1 | 2/2001 | Soliman |
| 6,188,752 B1 | 2/2001 | Lesley |
| 6,188,909 B1 | 2/2001 | Alanara |
| 6,188,957 B1 | 2/2001 | Bechtolsheim |
| 6,189,098 B1 | 2/2001 | Kaliski, Jr. |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,204,844 B1 | 3/2001 | Fumarolo |
| 6,205,330 B1 | 3/2001 | Winbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feague |
| 6,249,680 B1 | 6/2001 | Wax |
| 6,249,742 B1 | 6/2001 | Friederich |
| 6,249,744 B1 | 6/2001 | Morita |
| 6,249,873 B1 | 6/2001 | Richard |
| 6,253,074 B1 | 6/2001 | Carlsson |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,278,936 B1 | 8/2001 | Jones |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,317,684 B1 | 11/2001 | Roeseler |
| 6,321,091 B1 | 11/2001 | Holland |
| 6,321,092 B1 | 11/2001 | Fitch |
| 6,321,158 B1 | 11/2001 | DeLorme |
| 6,321,257 B1 | 11/2001 | Kotola |
| 6,324,524 B1 | 11/2001 | Lent |
| 6,327,473 B1 | 12/2001 | Soliman |
| 6,327,479 B1 | 12/2001 | Mikkola |
| 6,331,825 B1 | 12/2001 | Ladner |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,366,782 B1 | 4/2002 | Fumarolo |
| 6,366,856 B1 | 4/2002 | Johnson |
| 6,367,019 B1 | 4/2002 | Ansell |
| 6,370,389 B1 | 4/2002 | Isomursu |
| 6,377,209 B1 | 4/2002 | Krasner |
| 6,397,143 B1 | 5/2002 | Peschke |
| 6,400,314 B1 | 6/2002 | Krasner |
| 6,400,943 B1 | 6/2002 | Montoya |
| 6,400,958 B1 | 6/2002 | Isomursu |
| 6,411,254 B1 | 6/2002 | Moeglein |
| 6,415,224 B1 | 7/2002 | Wako |
| 6,421,002 B2 | 7/2002 | Krasner |
| 6,427,001 B1 | 7/2002 | Contractor |
| 6,429,808 B1 | 8/2002 | King |
| 6,433,734 B1 | 8/2002 | Krasner |
| 6,434,381 B1 | 8/2002 | Moore |
| 6,441,752 B1 | 8/2002 | Fomukong |
| 6,442,384 B1 | 8/2002 | Shah |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace |
| 6,466,788 B1 | 10/2002 | Carlsson |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,526,026 B1 | 2/2003 | Menon |
| 6,529,500 B1 | 3/2003 | Pandharipande |
| 6,529,722 B1 | 3/2003 | Heinrich |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey |
| 6,539,304 B1 | 3/2003 | Chansarkar |
| 6,542,464 B1 | 4/2003 | Takeda |

(56) References Cited

U.S. PATENT DOCUMENTS

| | | |
|---|---|---|
| 6,542,734 B1 | 4/2003 | Abrol |
| 6,542,743 B1 | 4/2003 | Soliman |
| 6,549,522 B1 | 4/2003 | Flynn |
| 6,549,776 B1 | 4/2003 | Joong |
| 6,549,844 B1 | 4/2003 | Egberts |
| 6,556,832 B1 | 4/2003 | Soliman |
| 6,560,461 B1 | 5/2003 | Fomukong |
| 6,560,534 B2 | 5/2003 | Abraham |
| 6,563,824 B1 | 5/2003 | Bhatia |
| 6,564,261 B1 | 5/2003 | Gudjonsson |
| 6,570,530 B2 | 5/2003 | Gaal |
| 6,571,095 B1 | 5/2003 | Koodli |
| 6,571,174 B2 | 5/2003 | Rigazio |
| 6,574,558 B2 | 6/2003 | Kohli |
| 6,580,390 B1 | 6/2003 | Hay |
| 6,584,552 B1 | 6/2003 | Kuno |
| 6,587,691 B1 | 7/2003 | Granstam |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,618,757 B1 * | 9/2003 | Babbitt et al. ............ 709/226 |
| 6,621,423 B1 | 9/2003 | Cooper |
| 6,621,452 B2 | 9/2003 | Knockeart |
| 6,621,810 B1 | 9/2003 | Leung |
| 6,628,233 B2 | 9/2003 | Knockeart |
| 23003/020193 | 10/2003 | Durst |
| 6,633,255 B2 | 10/2003 | Krasner |
| 6,640,184 B1 | 10/2003 | Rabe |
| 6,640,185 B2 | 10/2003 | Tokota |
| 6,643,516 B1 | 11/2003 | Stewart |
| 6,650,288 B1 | 11/2003 | Pitt |
| 6,661,353 B1 | 12/2003 | Gopen |
| 6,661,372 B1 | 12/2003 | Girerd |
| 6,665,539 B2 | 12/2003 | Sih |
| 6,665,541 B1 | 12/2003 | Krasner |
| 6,665,613 B2 | 12/2003 | Duvall |
| 6,665,715 B1 | 12/2003 | Houri |
| 6,671,620 B1 | 12/2003 | Garin |
| 6,677,894 B2 | 1/2004 | Sheynblat |
| 6,680,694 B1 | 1/2004 | Knockeart |
| 6,687,504 B1 | 2/2004 | Raith |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,652 B1 | 4/2004 | Sanqunetti |
| 6,721,716 B1 | 4/2004 | Gross |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,266 B1 | 6/2004 | Hundscheidt |
| 6,757,544 B2 | 6/2004 | Rangarajan |
| 6,757,545 B2 | 6/2004 | Nowak |
| 6,766,174 B1 | 7/2004 | Kenyon |
| 6,771,639 B1 | 8/2004 | Holden |
| 6,771,742 B2 | 8/2004 | McCalmont |
| 6,772,340 B1 | 8/2004 | Peinado |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McCraw |
| 6,799,049 B1 | 9/2004 | Zellner |
| 6,799,050 B1 | 9/2004 | Krasner |
| 6,801,159 B2 | 10/2004 | Swope |
| 6,801,850 B1 | 10/2004 | Wolfson |
| 6,804,524 B1 | 10/2004 | Vandermeijden |
| 6,807,534 B1 | 10/2004 | Erickson |
| 6,810,323 B1 | 10/2004 | Bullock |
| 6,810,405 B1 | 10/2004 | LaRue |
| 6,813,264 B2 | 11/2004 | Vassilovski |
| 6,813,501 B2 | 11/2004 | Kinnunen |
| 6,813,560 B2 | 11/2004 | Van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,816,782 B1 | 11/2004 | Walters |
| 6,819,919 B1 | 11/2004 | Tanaka |
| 6,820,069 B1 | 11/2004 | Kogan |
| 6,829,475 B1 | 12/2004 | Lee |
| 6,829,532 B2 | 12/2004 | Obradovich |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,839,630 B2 | 1/2005 | Sakamoto |
| 6,842,696 B2 | 1/2005 | Silvester |
| 6,842,715 B1 | 1/2005 | Gaal |
| 6,845,321 B1 | 1/2005 | Kerns |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,882,850 B2 | 4/2005 | McConnell |
| 6,885,874 B2 | 4/2005 | Grube |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,895,329 B1 | 5/2005 | Wolfson |
| 6,898,516 B2 | 5/2005 | Pechatnikov |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,910,818 B2 | 6/2005 | McLoone |
| 6,912,230 B1 | 6/2005 | Salkini |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,925,603 B1 | 8/2005 | Naito |
| 6,930,634 B2 | 8/2005 | Peng |

(56) References Cited

U.S. PATENT DOCUMENTS

| | | |
|---|---|---|
| 6,934,705 B2 | 8/2005 | Tu |
| 6,937,187 B2 | 8/2005 | Van Diggelen |
| 6,937,872 B2 | 8/2005 | Krasner |
| 6,940,950 B2 | 9/2005 | Dickinson |
| 6,941,144 B2 | 9/2005 | Stein |
| 6,944,535 B2 | 9/2005 | Iwata |
| 6,944,540 B2 | 9/2005 | King |
| 6,947,772 B2 | 9/2005 | Minear |
| 6,950,058 B1 | 9/2005 | Davis |
| 6,957,068 B2 | 10/2005 | Hutchison |
| 6,957,073 B2 | 10/2005 | Bye |
| 6,961,562 B2 | 11/2005 | Ross |
| 6,963,557 B2 | 11/2005 | Knox |
| 6,963,748 B2 | 11/2005 | Chithambaram |
| 6,965,754 B2 | 11/2005 | King |
| 6,965,767 B2 | 11/2005 | Maggenti |
| 6,968,044 B2 | 11/2005 | Beason |
| 6,970,871 B1 | 11/2005 | Rayburn |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohler |
| 6,985,747 B2 | 1/2006 | Chithambaram |
| 6,990,081 B2 | 1/2006 | Schaefer |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,058,506 B2 | 6/2006 | Kawase |
| 7,065,351 B2 | 6/2006 | Carter |
| 7,065,507 B2 | 6/2006 | Mohammed |
| 7,072,667 B2 | 7/2006 | Olrik |
| 7,079,857 B2 | 7/2006 | Maggenti |
| 7,089,110 B2 | 8/2006 | Pechatnikov |
| 7,092,385 B2 | 8/2006 | Gallant |
| 7,103,018 B1 | 9/2006 | Hansen |
| 7,103,574 B1 | 9/2006 | Peinado |
| 7,106,717 B2 | 9/2006 | Rousseau |
| 7,110,773 B1 | 9/2006 | Wallace |
| 7,136,466 B1 | 11/2006 | Gao |
| 7,136,838 B1 | 11/2006 | Peinado |
| 7,142,196 B1 | 11/2006 | Connor |
| 7,142,205 B2 | 11/2006 | Chithambaram |
| 7,145,900 B2 | 12/2006 | Nix |
| 7,151,946 B2 | 12/2006 | Maggenti |
| 7,167,187 B2 | 1/2007 | Scott |
| 7,171,220 B2 | 1/2007 | Belcea |
| 7,171,304 B2 | 1/2007 | Wako |
| 7,177,397 B2 | 2/2007 | McCalmont |
| 7,177,398 B2 | 2/2007 | Meer |
| 7,177,399 B2 | 2/2007 | Dawson |
| 7,184,418 B1 | 2/2007 | Baba |
| 7,200,380 B2 | 4/2007 | Havlark |
| 7,202,801 B2 | 4/2007 | Chou |
| 7,209,758 B1 | 4/2007 | Moll |
| 7,209,969 B2 | 4/2007 | Lahti |
| 7,218,940 B2 | 5/2007 | Niemenna |
| 7,221,959 B2 | 5/2007 | Lindqvist |
| 7,245,900 B1 | 7/2007 | Lamb |
| 7,245,910 B2 | 7/2007 | Osmo |
| 7,260,186 B2 | 8/2007 | Zhu |
| 7,260,384 B2 | 8/2007 | Bales |
| 7,266,376 B2 | 9/2007 | Nakagawa |
| 7,286,929 B2 | 10/2007 | Staton |
| 7,330,899 B2 | 2/2008 | Wong |
| 7,333,480 B1 | 2/2008 | Clarke |
| 7,340,241 B2 | 3/2008 | Rhodes |
| 7,369,508 B2 | 5/2008 | Parantainen |
| 7,369,530 B2 | 5/2008 | Keagy |
| 7,424,293 B2 | 9/2008 | Zhu |
| 7,426,380 B2 | 9/2008 | Hines |
| 7,428,571 B2 | 9/2008 | Ichimura |
| 7,436,785 B1 | 10/2008 | McMullen |
| 7,440,442 B2 | 10/2008 | Grabelsky |
| 7,450,951 B2 | 11/2008 | Vimpari |
| 7,453,990 B2 | 11/2008 | Welenson |
| 7,454,489 B2 | 11/2008 | Chauffour |
| 7,477,903 B2 | 1/2009 | Wilcock |
| 7,495,608 B1 | 2/2009 | Chen |
| 7,522,581 B2 | 4/2009 | Acharya |
| 7,565,157 B1 | 7/2009 | Ortega |
| 7,602,886 B1 | 10/2009 | Beech |
| 7,623,447 B1 | 11/2009 | Faccin |
| 7,627,331 B2 | 12/2009 | Winterbottom |
| 7,653,544 B2 | 1/2010 | Bradley |
| 7,660,321 B2 | 2/2010 | Cortes |
| 7,702,081 B1 | 4/2010 | Klesper |
| 7,711,094 B1 | 5/2010 | Olshansky |
| 7,739,033 B2 | 6/2010 | Murata |
| 7,747,258 B2 | 6/2010 | Farmer |
| 7,751,614 B2 | 7/2010 | Funakura |
| 7,774,003 B1 | 8/2010 | Ortega |
| 7,783,297 B2 | 8/2010 | Ishii |
| 7,822,823 B2 | 10/2010 | Jhanji |
| 7,881,233 B2 | 2/2011 | Bieselin |
| 7,881,730 B2 | 2/2011 | Sheha |
| 7,895,263 B1 | 2/2011 | Kirchmeier |
| 7,929,556 B2* | 4/2011 | Melia et al. .................. 370/401 |
| 7,937,067 B2 | 5/2011 | Maier |
| 8,175,921 B1* | 5/2012 | Kopra .................. 705/14.58 |
| 8,422,391 B2* | 4/2013 | Zhu .................. 370/252 |
| 8,531,995 B2* | 9/2013 | Khan et al. .................. 370/271 |
| 8,682,321 B2* | 3/2014 | Zhu .................. 455/435.1 |
| 2001/0011247 A1 | 8/2001 | O'Flaherty |
| 2001/0015756 A1 | 8/2001 | Wilcock |
| 2001/0016849 A1 | 8/2001 | Squibbs |
| 2002/0032036 A1 | 3/2002 | Nakajima |
| 2002/0037735 A1 | 3/2002 | Maggenti |
| 2002/0052214 A1 | 5/2002 | Maggenti |
| 2002/0058515 A1 | 5/2002 | Holler |
| 2002/0061760 A1 | 5/2002 | Maggenti |
| 2002/0069239 A1 | 6/2002 | Katada |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0085538 A1 | 7/2002 | Leung |
| 2002/0086683 A1 | 7/2002 | Kohar |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0118650 A1 | 8/2002 | Jagadeesan |
| 2002/0123327 A1 | 9/2002 | Vataja |
| 2002/0123354 A1 | 9/2002 | Nowak |
| 2002/0126656 A1 | 9/2002 | Park |
| 2002/0130906 A1 | 9/2002 | Miyaki |
| 2002/0158777 A1 | 10/2002 | Flick |
| 2002/0164998 A1 | 11/2002 | Younis |
| 2002/0169539 A1 | 11/2002 | Menard |
| 2002/0173317 A1 | 11/2002 | Nykanen |
| 2002/0191595 A1 | 12/2002 | Mar |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0014487 A1 | 1/2003 | Iwakawa |
| 2003/0016804 A1 | 1/2003 | Sheha |
| 2003/0026245 A1 | 2/2003 | Ejzak |
| 2003/0032448 A1 | 2/2003 | Bulthuis |
| 2003/0036848 A1 | 2/2003 | Sheha |
| 2003/0036949 A1 | 2/2003 | Kaddeche |
| 2003/0037163 A1 | 2/2003 | Kitada |
| 2003/0040272 A1 | 2/2003 | Lelievre |
| 2003/0045327 A1 | 3/2003 | Kobayashi |
| 2003/0054835 A1 | 3/2003 | Gutowski |
| 2003/0060938 A1 | 3/2003 | Duvall |
| 2003/0065788 A1 | 4/2003 | Salomaki |
| 2003/0072318 A1 | 4/2003 | Lam |
| 2003/0078054 A1 | 4/2003 | Okuda |

(56) References Cited

U.S. PATENT DOCUMENTS

| | | |
|---|---|---|
| 2003/0078064 A1 | 4/2003 | Chan |
| 2003/0081557 A1 | 5/2003 | Mettala |
| 2003/0096623 A1 | 5/2003 | Kim |
| 2003/0101329 A1 | 5/2003 | Lahti |
| 2003/0101341 A1 | 5/2003 | Kettler |
| 2003/0103484 A1 | 6/2003 | Oommen |
| 2003/0108176 A1 | 6/2003 | Kung |
| 2003/0109245 A1 | 6/2003 | McCalmont |
| 2003/0114157 A1 | 6/2003 | Spitz |
| 2003/0119521 A1 | 6/2003 | Tipnis |
| 2003/0119528 A1 | 6/2003 | Pew |
| 2003/0125064 A1 | 7/2003 | Koskinen |
| 2003/0126250 A1 | 7/2003 | Jhanji |
| 2003/0137961 A1 | 7/2003 | Tsirtsis |
| 2003/0149526 A1 | 8/2003 | Zhou |
| 2003/0151501 A1 | 8/2003 | Teckchandani |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0165254 A1 | 9/2003 | Chen |
| 2003/0182053 A1 | 9/2003 | Swope |
| 2003/0186709 A1 | 10/2003 | Rhodes |
| 2003/0196105 A1 | 10/2003 | Fineburg |
| 2003/0204640 A1 | 10/2003 | Sahineja |
| 2003/0223381 A1 | 12/2003 | Schroderus |
| 2003/0231190 A1 | 12/2003 | Jawerth |
| 2003/0236618 A1 | 12/2003 | Kamikawa |
| 2004/0002326 A1 | 1/2004 | Maher |
| 2004/0002814 A1 | 1/2004 | Gogic |
| 2004/0008225 A1 | 1/2004 | Campbell |
| 2004/0021567 A1 | 2/2004 | Dunn |
| 2004/0032485 A1 | 2/2004 | Stephens |
| 2004/0041729 A1 | 3/2004 | Rowitch |
| 2004/0043775 A1 | 3/2004 | Kennedy |
| 2004/0044623 A1 | 3/2004 | Wake |
| 2004/0047342 A1 | 3/2004 | Gavish |
| 2004/0047461 A1 | 3/2004 | Weisman |
| 2004/0054428 A1 | 3/2004 | Sheha |
| 2004/0068724 A1 | 4/2004 | Gardner |
| 2004/0076277 A1 | 4/2004 | Kuusinen |
| 2004/0098497 A1 | 5/2004 | Banet |
| 2004/0100976 A1 | 5/2004 | Chang |
| 2004/0124977 A1 | 7/2004 | Biffar |
| 2004/0132465 A1 | 7/2004 | Mattila |
| 2004/0146040 A1 | 7/2004 | Phan-Anh |
| 2004/0181689 A1 | 9/2004 | Kiyoto |
| 2004/0184584 A1 | 9/2004 | McCalmont |
| 2004/0186880 A1 | 9/2004 | Yamamoto |
| 2004/0190497 A1 | 9/2004 | Knox |
| 2004/0198332 A1 | 10/2004 | Lundsgaard |
| 2004/0198375 A1 | 10/2004 | Schwengler |
| 2004/0198386 A1 | 10/2004 | Dupray |
| 2004/0203732 A1 | 10/2004 | Brusilovsky |
| 2004/0204829 A1 | 10/2004 | Endo |
| 2004/0204847 A1 | 10/2004 | Yanai |
| 2004/0205151 A1 | 10/2004 | Sprigg |
| 2004/0205517 A1 | 10/2004 | Lampert |
| 2004/0220957 A1 | 11/2004 | McDonough |
| 2004/0229632 A1 | 11/2004 | Flynn |
| 2004/0242238 A1 | 12/2004 | Wang |
| 2004/0267445 A1 | 12/2004 | De Luca |
| 2005/0021769 A1 | 1/2005 | Kim |
| 2005/0027445 A1 | 2/2005 | McDonough |
| 2005/0028034 A1 | 2/2005 | Gantman |
| 2005/0031095 A1 | 2/2005 | Pietrowicz |
| 2005/0039178 A1 | 2/2005 | Marolia |
| 2005/0041578 A1 | 2/2005 | Huotari |
| 2005/0043037 A1 | 2/2005 | Loppe |
| 2005/0043038 A1 | 2/2005 | Maanoja |
| 2005/0053209 A1 | 3/2005 | D'Evelyn |
| 2005/0062636 A1 | 3/2005 | Conway |
| 2005/0063519 A1 | 3/2005 | James |
| 2005/0071671 A1 | 3/2005 | Karaoguz |
| 2005/0078612 A1 | 4/2005 | Lang |
| 2005/0083911 A1 | 4/2005 | Grabelsky |
| 2005/0085999 A1 | 4/2005 | Onishi |
| 2005/0086467 A1 | 4/2005 | Asokan |
| 2005/0090236 A1 | 4/2005 | Schwinke |
| 2005/0101335 A1 | 5/2005 | Kelly |
| 2005/0107673 A1 | 5/2005 | Ball |
| 2005/0111630 A1 | 5/2005 | Potorney |
| 2005/0112030 A1 | 5/2005 | Gaus |
| 2005/0119012 A1 | 6/2005 | Merheb |
| 2005/0125148 A1 | 6/2005 | Van Buer |
| 2005/0134504 A1 | 6/2005 | Harwood |
| 2005/0135569 A1 | 6/2005 | Dickinson |
| 2005/0136885 A1 | 6/2005 | Kaltsukis |
| 2005/0149430 A1 | 7/2005 | Williams |
| 2005/0159883 A1 | 7/2005 | Humphries |
| 2005/0174991 A1 | 8/2005 | Keagy |
| 2005/0190746 A1 | 9/2005 | Xiong |
| 2005/0190892 A1 | 9/2005 | Dawson |
| 2005/0192822 A1 | 9/2005 | Hartenstein |
| 2005/0201358 A1 | 9/2005 | Nelson |
| 2005/0201528 A1 | 9/2005 | Meer |
| 2005/0201529 A1 | 9/2005 | Nelson |
| 2005/0209995 A1 | 9/2005 | Aksu |
| 2005/0213716 A1 | 9/2005 | Zhu |
| 2005/0219067 A1 | 10/2005 | Chung |
| 2005/0232252 A1 | 10/2005 | Hoover |
| 2005/0239458 A1 | 10/2005 | Hurtta |
| 2005/0242168 A1 | 11/2005 | Tesavis |
| 2005/0255857 A1 | 11/2005 | Kim |
| 2005/0259675 A1 | 11/2005 | Tuohino |
| 2005/0261002 A1 | 11/2005 | Cheng |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman |
| 2006/0019724 A1 | 1/2006 | Bahl |
| 2006/0023747 A1 | 2/2006 | Koren |
| 2006/0026288 A1 | 2/2006 | Acharya |
| 2006/0041375 A1 | 2/2006 | Witmer |
| 2006/0053225 A1 | 3/2006 | Poikselka |
| 2006/0058102 A1 | 3/2006 | Nguyen |
| 2006/0068753 A1 | 3/2006 | Karpen |
| 2006/0069503 A1 | 3/2006 | Suomela |
| 2006/0072729 A1 | 4/2006 | Lee |
| 2006/0074547 A1 | 4/2006 | Kaufman |
| 2006/0077911 A1 | 4/2006 | Shaffer |
| 2006/0088152 A1 | 4/2006 | Green |
| 2006/0104306 A1 | 5/2006 | Adamczyk |
| 2006/0114934 A1 | 6/2006 | Shin |
| 2006/0120517 A1 | 6/2006 | Moon |
| 2006/0128395 A1 | 6/2006 | Muhonen |
| 2006/0135177 A1 | 6/2006 | Winterbottom |
| 2006/0188083 A1 | 8/2006 | Breen |
| 2006/0193447 A1 | 8/2006 | Schwartz |
| 2006/0200359 A1 | 9/2006 | Khan |
| 2006/0212558 A1 | 9/2006 | Sahinoja |
| 2006/0212562 A1 | 9/2006 | Kushwaha |
| 2006/0224752 A1* | 10/2006 | Parekh .......................... 709/230 |
| 2006/0233338 A1 | 10/2006 | Venkata |
| 2006/0234639 A1 | 10/2006 | Kushwaha |
| 2006/0234698 A1 | 10/2006 | Fok |
| 2006/0239205 A1 | 10/2006 | Warren et al. |
| 2006/0250987 A1 | 11/2006 | White |
| 2006/0258380 A1 | 11/2006 | Liebowitz |
| 2006/0259365 A1 | 11/2006 | Agarwal |
| 2006/0268120 A1 | 11/2006 | Funakura |
| 2006/0270421 A1 | 11/2006 | Phillips |
| 2006/0281437 A1 | 12/2006 | Cook |
| 2006/0293024 A1 | 12/2006 | Benco |
| 2006/0293066 A1 | 12/2006 | Edge |
| 2007/0003024 A1 | 1/2007 | Olivier |
| 2007/0004461 A1 | 1/2007 | Bathina |
| 2007/0014282 A1 | 1/2007 | Mitchell |
| 2007/0019614 A1 | 1/2007 | Hoffmann |
| 2007/0021908 A1 | 1/2007 | Jaugilas |
| 2007/0022011 A1 | 1/2007 | Altberg |

(56) References Cited

U.S. PATENT DOCUMENTS

| | | |
|---|---|---|
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0032244 A1 | 2/2007 | Counts |
| 2007/0036139 A1 | 2/2007 | Patel |
| 2007/0049288 A1 | 3/2007 | Lamprecht |
| 2007/0054676 A1 | 3/2007 | Duan et al. |
| 2007/0060097 A1 | 3/2007 | Edge |
| 2007/0072553 A1 | 3/2007 | Barbera |
| 2007/0081635 A1 | 4/2007 | Croak |
| 2007/0083911 A1 | 4/2007 | Madden |
| 2007/0115941 A1 | 5/2007 | Patel |
| 2007/0121601 A1 | 5/2007 | Kikinis |
| 2007/0139411 A1 | 6/2007 | Jawerth |
| 2007/0149166 A1 | 6/2007 | Turcotte |
| 2007/0149213 A1 | 6/2007 | Lamba |
| 2007/0162228 A1 | 7/2007 | Mitchell |
| 2007/0182631 A1 | 8/2007 | Berlinsky |
| 2007/0201623 A1 | 8/2007 | Hines |
| 2007/0206568 A1 | 9/2007 | Silver |
| 2007/0206613 A1 | 9/2007 | Silver |
| 2007/0208687 A1 | 9/2007 | O'Conor |
| 2007/0242660 A1 | 10/2007 | Xu |
| 2007/0253429 A1 | 11/2007 | James |
| 2007/0254625 A1 | 11/2007 | Edge |
| 2007/0263610 A1 | 11/2007 | Mitchell |
| 2007/0270164 A1 | 11/2007 | Maier |
| 2007/0291733 A1 | 12/2007 | Doran |
| 2008/0032703 A1 | 2/2008 | Krumm |
| 2008/0037715 A1 | 2/2008 | Prozeniuk |
| 2008/0045250 A1 | 2/2008 | Hwang |
| 2008/0063153 A1 | 3/2008 | Krivorot |
| 2008/0065775 A1 | 3/2008 | Polk |
| 2008/0077324 A1 | 3/2008 | Hatano |
| 2008/0117859 A1 | 5/2008 | Shahidi |
| 2008/0129475 A1 | 6/2008 | Breed |
| 2008/0162637 A1 | 7/2008 | Adamczyk |
| 2008/0176582 A1 | 7/2008 | Ghai |
| 2008/0186164 A1 | 8/2008 | Emigh |
| 2008/0195314 A1 | 8/2008 | Green |
| 2008/0200182 A1 | 8/2008 | Shim |
| 2008/0214202 A1 | 9/2008 | Toomey |
| 2008/0220747 A1 | 9/2008 | Ashkenazi |
| 2008/0288166 A1 | 11/2008 | Onishi |
| 2009/0003535 A1 | 1/2009 | Grabelsky |
| 2009/0067417 A1 | 3/2009 | Kalavade |
| 2009/0097450 A1 | 4/2009 | Wallis |
| 2009/0113346 A1 | 4/2009 | Wickramasuriya |
| 2009/0128404 A1 | 5/2009 | Martino |
| 2009/0177557 A1 | 7/2009 | Klein |
| 2009/0224931 A1 | 9/2009 | Dietz |
| 2009/0298488 A1 | 12/2009 | Snapp |
| 2009/0328163 A1 | 12/2009 | Preece |
| 2010/0003976 A1 | 1/2010 | Zhu |
| 2010/0004993 A1 | 1/2010 | Troy |
| 2010/0042592 A1 | 2/2010 | Stolz |
| 2010/0054220 A1 | 3/2010 | Bischinger |
| 2010/0067444 A1* | 3/2010 | Faccin et al. ............... 370/328 |
| 2010/0167760 A1 | 7/2010 | Kim |
| 2010/0188992 A1 | 7/2010 | Raleigh |
| 2010/0198933 A1 | 8/2010 | Smith |
| 2010/0223222 A1 | 9/2010 | Zhou |
| 2010/0268848 A1 | 10/2010 | Maurya |
| 2011/0113060 A1 | 5/2011 | Martini |
| 2011/0165861 A1 | 7/2011 | Wilson et al. |
| 2012/0314699 A1* | 12/2012 | Qiu et al. ............... 370/352 |
| 2013/0012232 A1 | 1/2013 | Titus |

FOREIGN PATENT DOCUMENTS

| | | |
|---|---|---|
| WO | WO02/11407 | 2/2002 |
| WO | WO2004/025941 | 3/2004 |
| WO | WO2005051033 | 6/2005 |
| WO | WO2007/027166 | 3/2007 |

OTHER PUBLICATIONS

Qualcomm CDMA Technologies, LBS Control Plane Roaming—80-VD377-1 NP A, 2006, pp. 1-10.

Qualcomm CDMA Technologies, MS Resident User Plane LBS Roaming—80-VC718-1 E, 2006, pp. 1-37.

3$^{rd}$ Generation Partnership Project 2, Position Determination Service Standard for Dual Mode Spread Spectrum Systems, Feb. 16, 2001, pp. i-X, 1-1-1-5, 2-1-2-2, 3-1-3-51, 4-1-4-66, A-1-A2, B-1-B-2, C-1-C-2, D-1-D-2.

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

Extended European Search Report from EPO in European Appl. No. 06827172.5 dated Dec. 29, 2009.

Qualcomm CDMA Technologies, LBS Control Plane/User Plane Overview—80-VD378-1 NP B, 2006, pp. 1-36.

Bhalla et al, TELUS Technology Strategy—LBS Roaming Summit, Sep. 19, 2006.

Alfredo Aguirre, Ilusacell, First and Only Carrier in Mexico with a 3G CDMA Network, 2007.

Mike McMullen, Sprint, LBS Roaming Summit, Sep. 19, 2006.

Nars Haran, U.S. Cellular, Packet Data—Roaming and LBS Overview, Nov. 2, 2007, pp. 1-15.

Location Based Services V2 Roaming Support (non proprietary), 80-V8470-2NP A, dated Jan. 27, 2005, pp. 1-56.

Yilin Ahao, Efficient and reliable date transmission for cellular and GPS based mayday systems, Nov. 1997, IEEE, IEEE Conference on Intelligent Transportation System, 1997. ITSC 97, 555-559.

Examiner's Office Letter in Japanese Patent Application No. 2006-542691 dated Sep. 7, 2009.

JP Laid-Open Gazette No. 2004-158947 (English abstract only).

JP Laid-Open Gazette No. 2007-507123 (counterpart English text US Patent Application Publication No. 2007/0054676).

T. Hattori, "Wireless Broadband Textbook," IDG Japan, Jun. 10, 2002, p. 142-p. 143. (no English text).

Schulzrinne et al., Emergency Services for Internet Telephony Systems draft-schulzrinne-sipping-emergency-arch, IETF Standard Working Draft, Feb. 4, 2004, 1-22.

International Search Report received in PCT/US12/00100 dated Mar. 13, 2013.

International Search Report received in PCT/US2011/02001 dated Apr. 27, 2012.

International Search Report received in PCT/US2011/000100 dated Apr. 24, 2012.

* cited by examiner

MOBILE INTERNET PROTOCOL (IP) LOCATION

The present application is a continuation of U.S. application Ser. No. 13/402,406 entitled "Mobile Internet Protocol (IP) Location", filed on Feb. 22, 2012; which claims priority from U.S. Provisional No. 61/457,316, entitled "Mobile Internet Protocol (IP) Location", to Zhu, filed Feb. 25, 2011; and from U.S. Provisional No. 61/573,086, entitled "Mobile Internet Protocol (IP) Location", to Zhu, filed Aug. 30, 2011; the entirety of all three of which are explicitly incorporated herein by reference.

BACKGROUND OF THE INVENTION

1. Field of the Invention

This invention relates generally to wireless Internet Service Providers (ISPs), and information content delivery services/providers. More particularly, it relates to location services for the wireless industry and Web content providers.

2. Background of Related Art

Computer networks amass a collection of digital devices (e.g. computers, mobile devices, etc.), and cooperate with one another to permit communication amongst devices integrated within.

Every device that operates on a computer network is allotted a unique numerical identifier. An Internet Protocol address (IP address), for instance, is a numerical identifier assigned to each device operating on a Transmission Control Protocol/Internet Protocol (TCP/IP) network. An IP address enables a specific network node (e.g. a computer) to be targeted in a communication session and/or an information transmission. Moreover, an IP address identifies the location of a particular device on a network, permitting a communication session and/or an information transmission to be routed accurately.

An IP address is either statically or dynamically assigned to a network device.

A dynamically assigned IP address is allocated to a device each time the device accesses a network (e.g. each time a computer is booted), and/or each time an inherent timer has expired. A dynamic IP address is not fixed for any specific network device. Rather, a multitude of various dynamic IP addresses may be assigned to a host throughout the course of a network session.

Alternatively, a statically assigned IP address is permanently allocated to a network node. In particular, a static IP address is configured manually in the hardware or software portion of a device and thus provides a constant source of identification.

Two versions of the Internet Protocol are currently in use: Internet Protocol version 4 (IPv4) and Internet Protocol version 6 (IPv6). IPv4 and IPv6 each deploy variant addressing schemes.

IPv4 addresses are 32 bits long, yielding an address space that consists of $2^{32}$ unique IP addresses. Recently, as a result of the monumental growth of the internet, the supply of unallocated IPv4 public IP addresses (i.e. globally unique IP addresses that may be routed on the internet) has rapidly diminished.

Consequently, IPv6 was developed to broaden the supply of available address space. An IPv6 address contains 128 bits, providing $2^{128}$ unique IP addresses, which is enough to provide global unique IP addresses to all digital devices. Yet, the majority of today's network operators continue to use IPv4. Thus, several methods have been enacted in an attempt to conserve IPv4 address space.

For instance, one address conservation tactic incorporates private IP addresses. A private IP address is not globally unique and therefore not routable on the internet. Rather, private IP addresses are reserved for private networks, upon which devices primarily communicate and transfer information amongst other locally connected devices. Devices on a private network do not engage in frequent connectivity with outside networks, nor are they directly connected to the internet. Hence, as opposed to a globally unique public IP address, a private IP address is only required to be unique to devices operating on a common private network. Therefore, private IP addresses are essentially unique local addresses, enabling a range of private IP addresses to be reused over a multitude of private networks.

When a device on a private network attempts to access the internet, the device's private IP address is first converted to a public IP address. Address conversion masks a requesting device's private IP address, rendering the address undetectable to external network devices. Address conversion is commonly achieved via Network Address Translation (NAT).

FIG. 4 portrays a conventional network topology incorporating a Network Address Translation (NAT) enabled device.

A device 400 with Network Address Translation (NAT) functionality (e.g. a router, a gateway, a firewall, etc.) is situated between a private network 410 and a public network 420 (e.g. the internet). Private network addresses are not routable on the internet. Therefore, any device on a private network 410 attempting to access a node (e.g. a web server) on a public network 420 (e.g., the internet) must first pass communication through a Network Address Translation (NAT) enabled device 400. Network Address Translation (NAT) 400 converts a private IP address to a public IP address, and vice-versa, by referencing and recording address transformations in a Network Address Translation (NAT) table 430.

FIG. 5 portrays a conventional transmission of an IP packet from a private network node to a public network node using Network Address Translation (NAT).

A Network Address Translation (NAT) enabled device is furnished with a pool of globally unique public IP addresses. In step 500, a device with a private IP address transmits an IP packet to a device (e.g. a web server) operating on a public network. As depicted in step 510, the Network Address Translation (NAT) device on the private network intercepts the transmitted IP packet. Network Address Translation (NAT) then converts the source address in the transmitted IP packet from a private IP address to a public IP address, selected from the Network Address Translation (NAT) routable address pool, as shown in step 520. In step 530, Network Address Translation (NAT) subsequently records the new public/private IP address combination in the Network Address Translation (NAT) table for future lookup. The same address conversion is performed in all subsequent IP packets transmitted across the same line of communication.

FIG. 6 portrays a conventional transmission of an IP packet from a public network node to a private network node using Network Address Translation (NAT).

An IP packet is transmitted from a public network node to a private network node, as depicted in step 600. The transmitted IP packet is subsequently intercepted by a Network Address Translation (NAT) enabled device, configured at an entry point on the receiving private network, as shown in step 610. Network Address Translation (NAT) detects the destination address designated in the received IP packet and queries the Network Address Translation (NAT) table for a match in step 620. If a match is detected (step 630), the public IP address in the packet destination address field is converted to an affiliated private IP address in step 650, as recorded in the Network Address Translation (NAT) table. The packet is thereafter routed to an appropriate destination device in step 660. In the event that a match is not discovered in the Network Address Translation (NAT) table, the packet is dropped (step 640).

A proxy server may alternatively function as a gateway device between a private network and a public network.

FIG. 7 depicts a conventional network topology incorporating a proxy server.

As depicted in FIG. 7, a proxy server 700 is situated between a public network 720 and a private network 710 (i.e. a proxy server 700 is configured at an entry node on a private network 610). A network topology deploying a proxy server 700 routes all communication/information requests transmitted from a private network 710 to a public network 720, and vice versa, through the proxy server 700.

Similar to Network Address Translation (NAT), a proxy server may shield the identity of a device on a private network from being exposed to the Internet. A proxy server is also able to modify received IP packets before forwarding packets to an intended destination. Therefore, a proxy server may perform address conversion in an IP packet and additionally append any relevant application specific information.

The location of a public IP address assigned to a device is currently obtainable on the internet via request to a suitable web service. For instance, http://www.ip2location.com enables a user to supply an IP address in return for location information.

There are numerous situations in which the location of a web client associated with a particular Internet session would be beneficial to a business. For instance, a bank may desire the location of a client requesting online banking resources for security purposes (e.g. authentication and/or anti-fraud). IP location services may additionally be beneficial in law enforcement scenarios and assisting in 911 emergency location determination. Moreover, IP location services enable a business to target promotional information to relevant consumers based on a device's proximity to a particular site of interest. IP location services furthermore enable a business to engage in location based advertising.

There are companies (e.g. Quova) that provide commercial IP location services. However, current IP location services are only applicable to wireline networks (e.g. cable or DSL ISP providers) where static location of each individual user can be pre-provisioned.

Unfortunately, location information associated with a public IP address that is allocated to a mobile device is not available. Instead, current IP location services are merely able to provide the identity of an internet service provider (ISP) that owns an IP address assigned to a mobile device. Hence at the moment, it is not possible to locate a mobile device based upon the public IP address that a mobile device is using.

Wireless packet data services are provided by most wireless carriers using various technologies (e.g. UMTS, LTE, CDMA1x, WiMAX, WiFi hotspots, etc.). While smart phones with high processing power and a high resolution display are popular, more people are using mobile phones to access web interfaces via a built-in web browser. Consumers desire an IP location service that is able to provide location information based upon a mobile device's IP address.

SUMMARY OF THE INVENTION

In accordance with the principles of the present invention, a mobile Internet protocol (IP) location server comprises a mobile location protocol interface to receive an Internet protocol (IP) location request for location of a given mobile device. An identifier resolver converts a public Internet protocol (IP) address supplied in the IP location request, to a real mobile identifier of the given mobile device. A location manager obtains a geographic location of the given mobile device based upon the real mobile identifier of the given mobile device.

A method of providing location for a mobile device in a private network in accordance with another aspect of the invention comprises receiving an Internet protocol (IP) location request for location of a given mobile device from a requesting device. An owner of an IP address in the IP location request is determined. A real mobile identifier of the given mobile device is resolved based on a public IP address of the given mobile device. Location for the given mobile device is obtained using the real mobile identifier, and the obtained location is returned to the requesting device.

BRIEF DESCRIPTION OF THE DRAWINGS

Features and advantages of the present invention become apparent to those skilled in the art from the following description with reference to the drawings, in which.

DETAILED DESCRIPTION OF ILLUSTRATIVE EMBODIMENTS

In accordance with the principles of the present invention, a method and apparatus for acquiring a geographic location for a mobile device, based on a public IP address that the mobile device is using, comprises a mobile IP location server.

A web service requests mobile IP location services for a particular mobile device by transmitting an IP location request to the mobile IP location server, in accordance with the principles of the present invention. An IP location request preferably incorporates a mobile device's public IP address, a port number over which the mobile device is communicating, and an application type for the requesting web service.

A mobile IP location server is comprised of three functional elements: a mobile location protocol (MLP) interface, an identifier resolver, and a location manager.

All requests for location services are transmitted over the mobile location protocol (MLP) interface, in accordance with the principles of the present invention.

The identifier resolver converts a public IP address supplied in an IP location request, to a corresponding device's real mobile identifier, e.g., IMSI, MSISDN, etc. In accordance with the principles of the present invention, the identifier resolver performs address conversion by querying either a Network Address Translation (NAT) enabled device or an HTTP proxy server configured on a mobile device's serving network.

In accordance with the principles of the present invention, the location manager utilizes existing location services to obtain a geographic location for a mobile device, based upon the device's real mobile identifier.

A mobile IP location server may be used for commercial IP location services, wherein city level civic location information is provided, with consideration of subscriber privacy settings. Additionally, a mobile IP location server may perform emergency IP location services (e.g. E-911 location determination), in which precise location is provided with full civic location.

The present invention provides a mobile IP location server that retrieves the location of a mobile device, based on the public IP address that the mobile device is using. A web service requests location information for a particular public IP address by transmitting an IP location request to the mobile IP location server, in accordance with the principles of the present invention.

Figure 1:
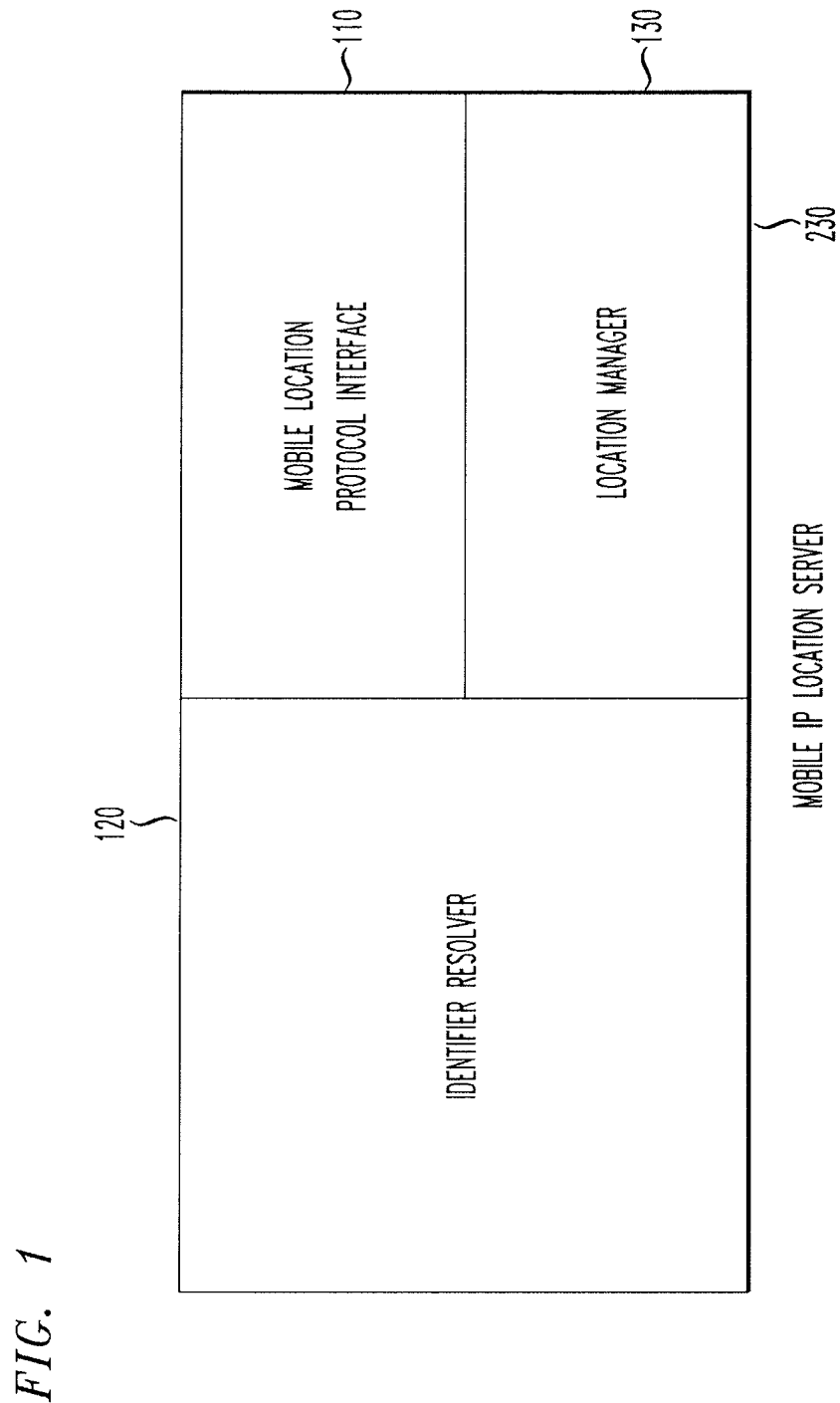
FIG. 1 portrays an exemplary mobile IP location server, in accordance with the principles of the present invention.

FIG. 1 portrays an exemplary mobile IP location server, in accordance with the principles of the present invention.

As depicted in FIG. 1, the mobile IP location server 230 comprises three main functional elements: a mobile location protocol (MLP) interface 110, an identifier resolver 120, and a location manager 130.

The mobile location protocol (MLP) interface 110 accepts all IP location requests transmitted to the mobile IP location server 230 and returns all IP location responses. A web service interacts with the mobile location protocol (MLP) interface 110 to request IP location services from the mobile IP location server 230. The mobile location protocol (MLP) interface 110 additionally interacts with location applications to request and obtain location information for particular public IP addresses.

The identifier resolver 120 interworks with network entities, e.g., a firewall, a Hypertext Transfer Protocol (HTTP) proxy server, a serving gateway and/or a Packet Data Network (PDN) gateway to convert a public IP address received for a mobile device to the device's real mobile identifier, e.g., IMSI, MSISDN, etc.

The location manager 130 is a location server (e.g. MPC, GMLC, etc.) that determines a mobile device's current geographic location via conventional mobile location services. A conventional mobile location service uses a device's real mobile identifier (e.g. IMSI, MSISDN, etc.) to obtain a geographic location for that device.

A web service requests IP location services by transmitting an IP location request to the mobile IP location server 100, in accordance with the principles of the present invention. In one particular embodiment, a web service may trigger the transmittal of an IP location request to the mobile IP location server 100, each instance the web service is accessed.

An IP location request preferably contains a mobile device's public IP address, the port number over which a mobile device is communicating, and an application type for the requesting web service.

Due to dynamic address allocation, a mobile device may be reassigned different public IP addresses as it moves and re-registers on a network. Moreover, a mobile device's public IP address may be periodically released on account of idle timeouts. Thus, a public IP address is not a constant source of identification and may not be used to directly identify a specific mobile device.

Moreover, existing control plane location services retrieve location information for a mobile device based on a device's real mobile identifier (e.g. ISMI, MSISDN, etc.), not a device's public IP address.

Therefore, unless a mobile device owns a static public IP address (i.e., a public IP address that remains constant), the public IP address supplied in an IP location request cannot be reliably used to directly identify or locate a mobile device.

The inventive mobile IP location server 100 retrieves a mobile device's real mobile identifier (e.g. IMSI, MSISDN, etc.) based upon the public IP address indicated in a received IP location request. The mobile IP location server 100 then queries a location service to obtain a geographic location for the relevant mobile device, based on the device's retrieved mobile identifier, e.g., IMSI, MSISDN, etc.

Figure 2:
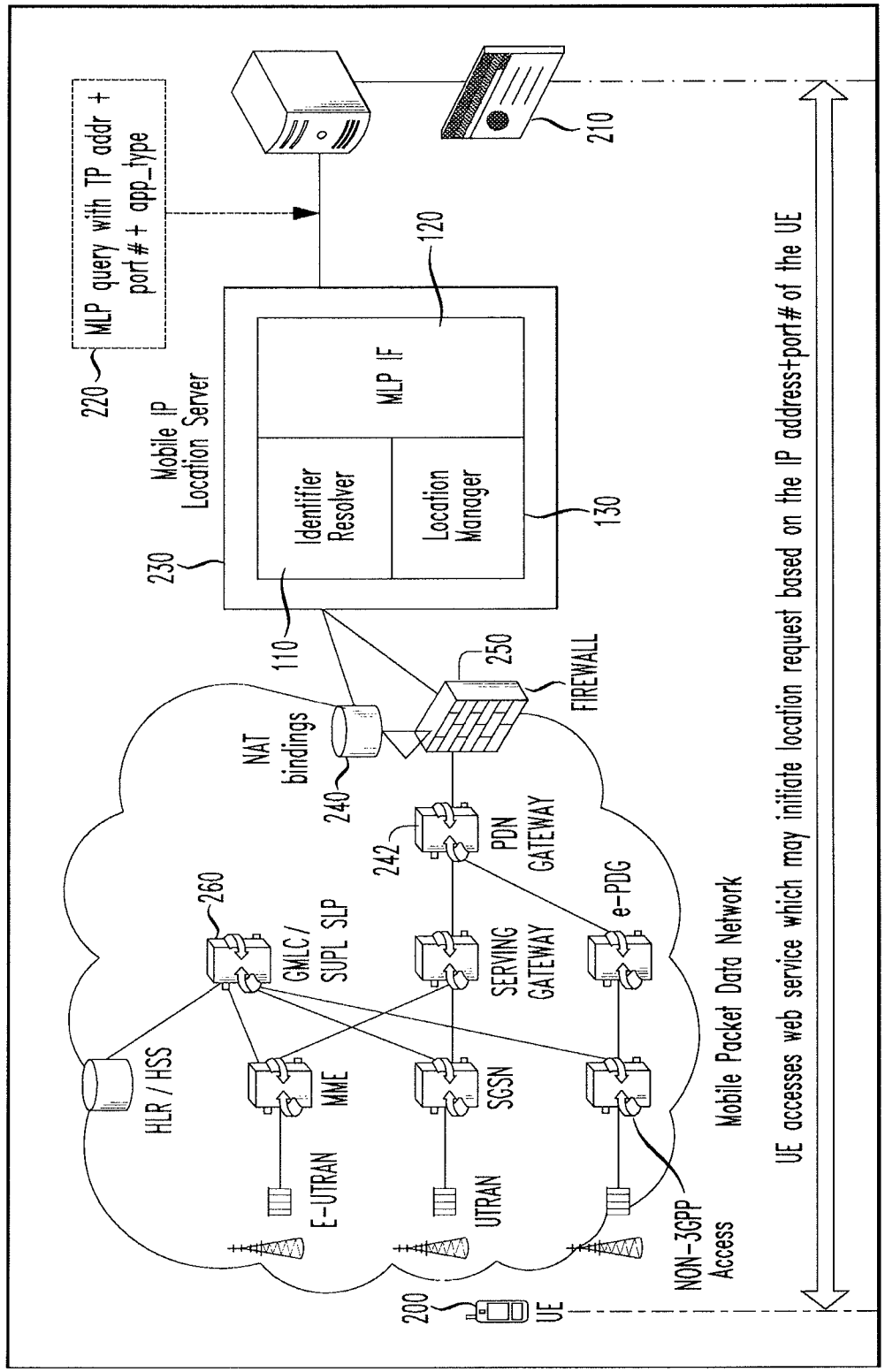
FIG. 2 illustrates exemplary high level architecture of IP Mobile Location Services in a 3GPP network environment (including the support of non-3GPP access), in accordance with the principles of the present invention.

FIG. 2 illustrates an exemplary high level architecture of a mobile IP location server 230 in a 3GPP network environment (including the support of non-3GPP access), in accordance with the principles of the present invention.

In accordance with the principles of the present invention, a mobile device 200 accesses a web service 210, which triggers an IP location request 220 to the mobile IP location server 230. The transmitted IP location request 220 incorporates the mobile device's 200 public IP address, port number, and an application type for the web service 210 that transmitted the request 220.

The mobile IP location server 230 interacts with a network address translation enabled device 240 or a proxy server 250 to convert the public IP address supplied in the IP location request to the corresponding device's real mobile identifier, e.g., ISMI, MSISDN, etc. Following address conversion, the mobile IP location server 230 initiates a location request to a location server 260 based on the mobile identifier (e.g., ISMI, MSISDN, etc.) retrieved for the relevant mobile device 200. Location information for the mobile device 200 is returned to the mobile IP location server 230 and forwarded to the web service 210 that initiated the IP location request 220.

Figure 3:
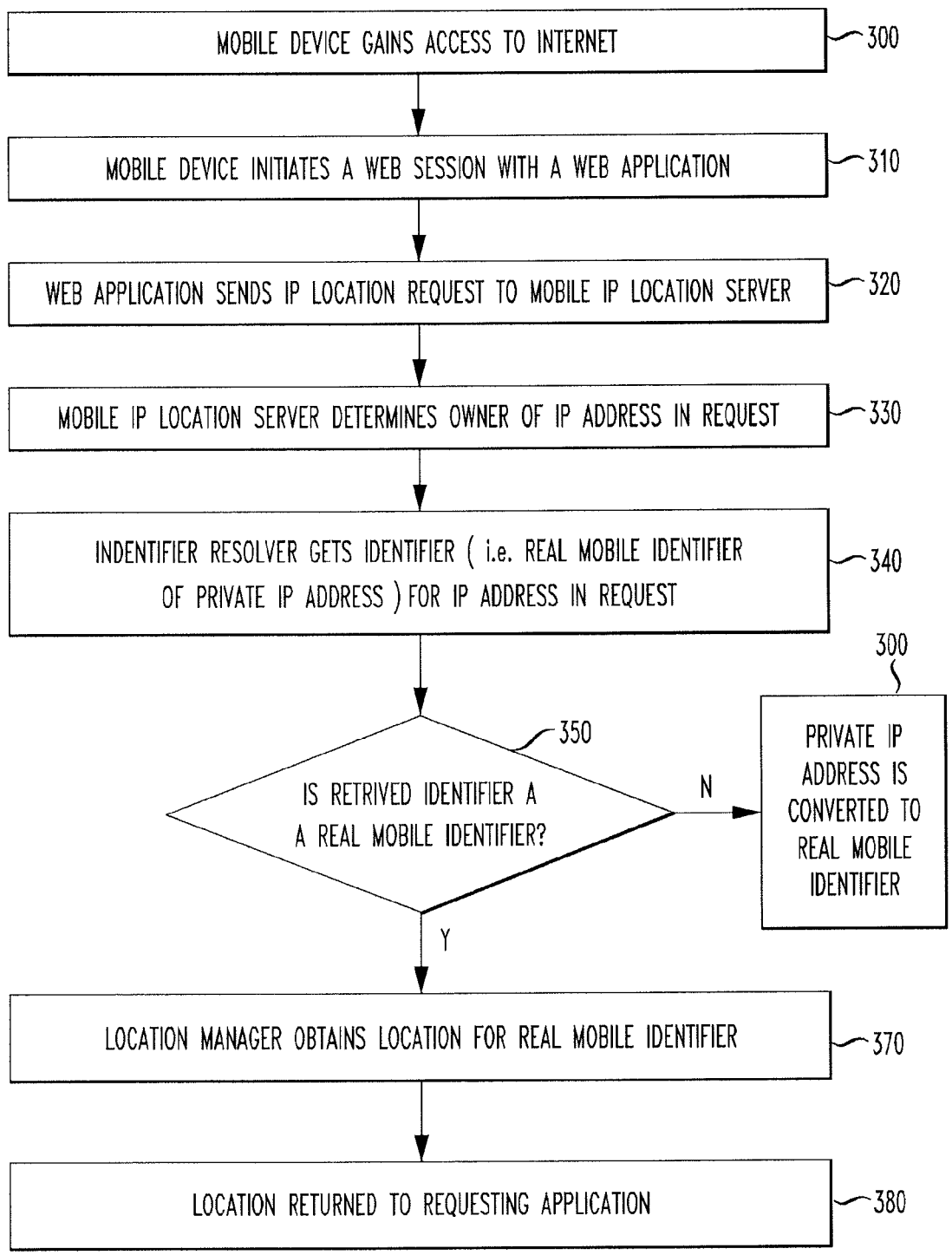
FIG. 3 illustrates an exemplary mobile IP location service flow using a mobile IP location server, in accordance with the principles of the present invention.
Figure 4:
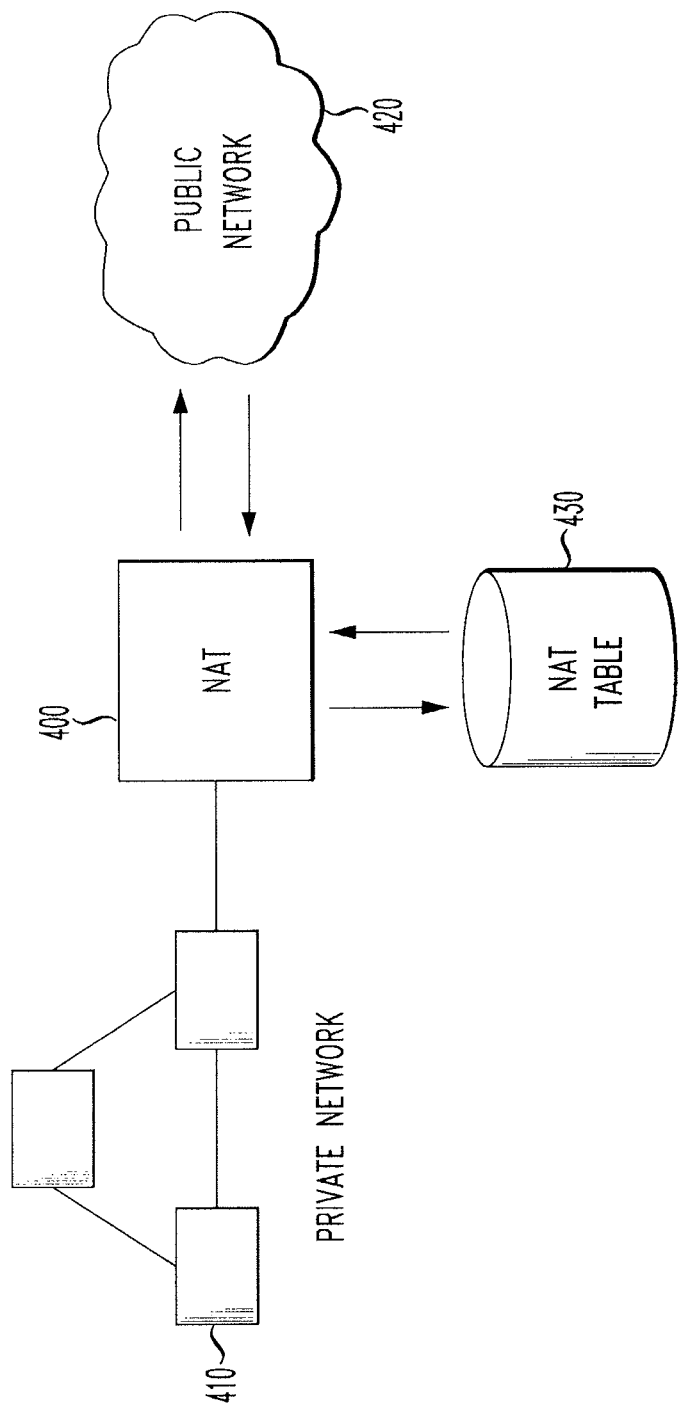
FIG. 4 portrays a conventional network topology incorporating a Network Address Translation (NAT) enabled device.
Figure 5:
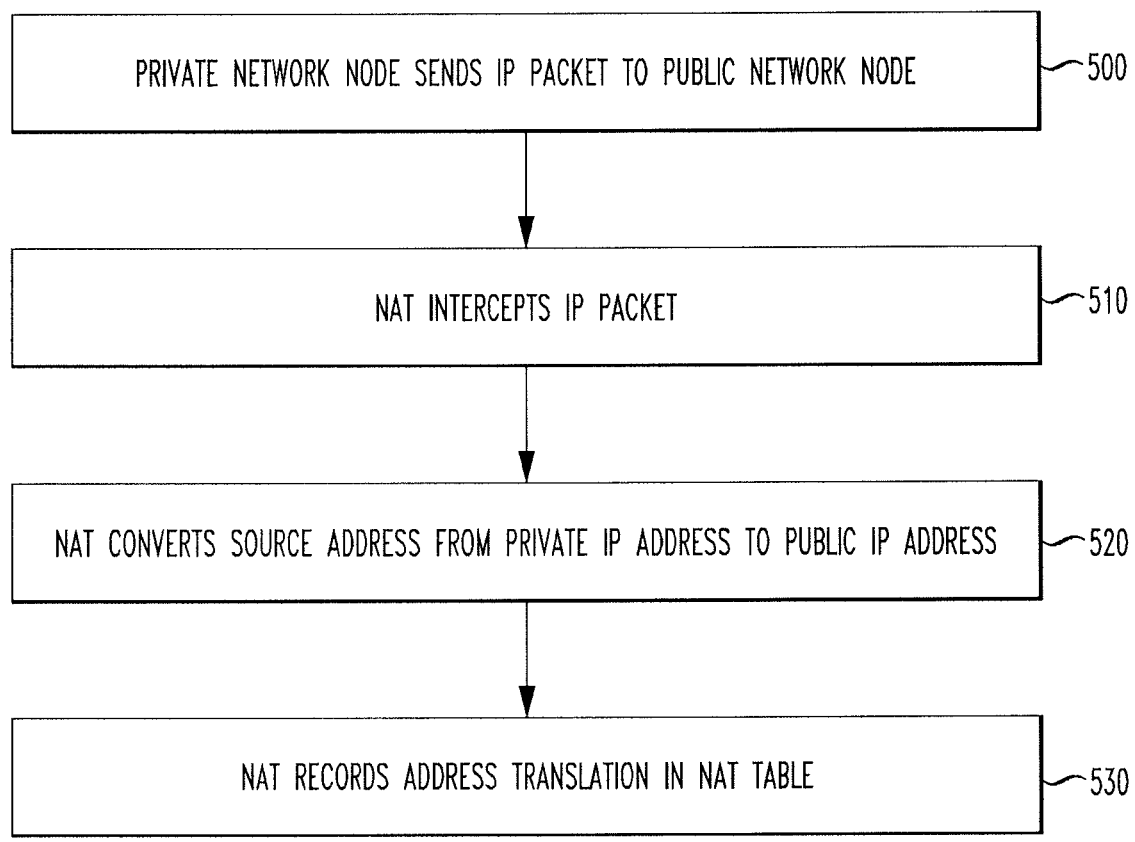
FIG. 5 portrays a conventional transmission of an IP packet from a private network node to a public network node using Network Address Translation (NAT).
Figure 6:
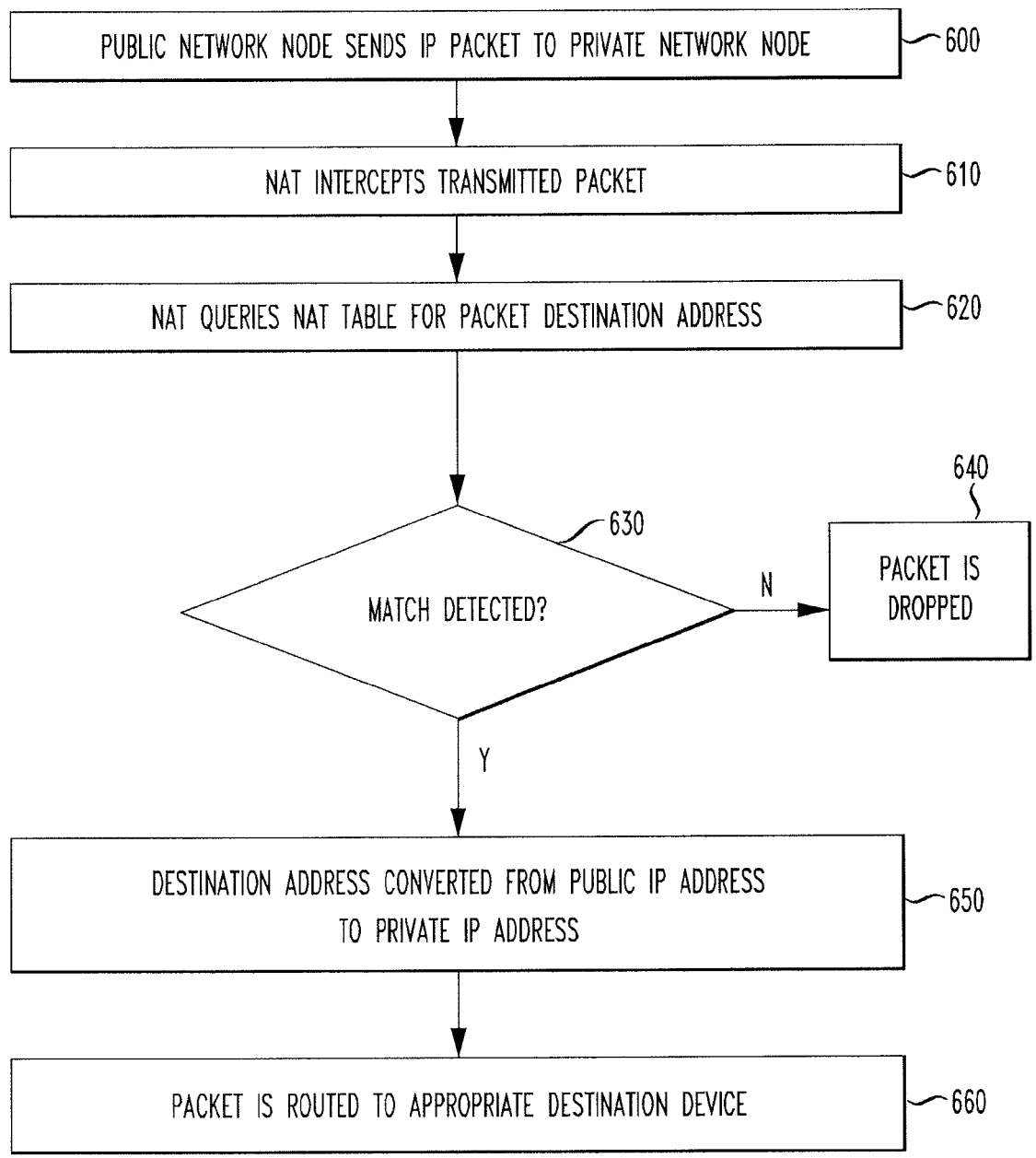
FIG. 6 portrays a conventional transmission of an IP packet from a public network node to a private network node using Network Address Translation (NAT).
Figure 7:
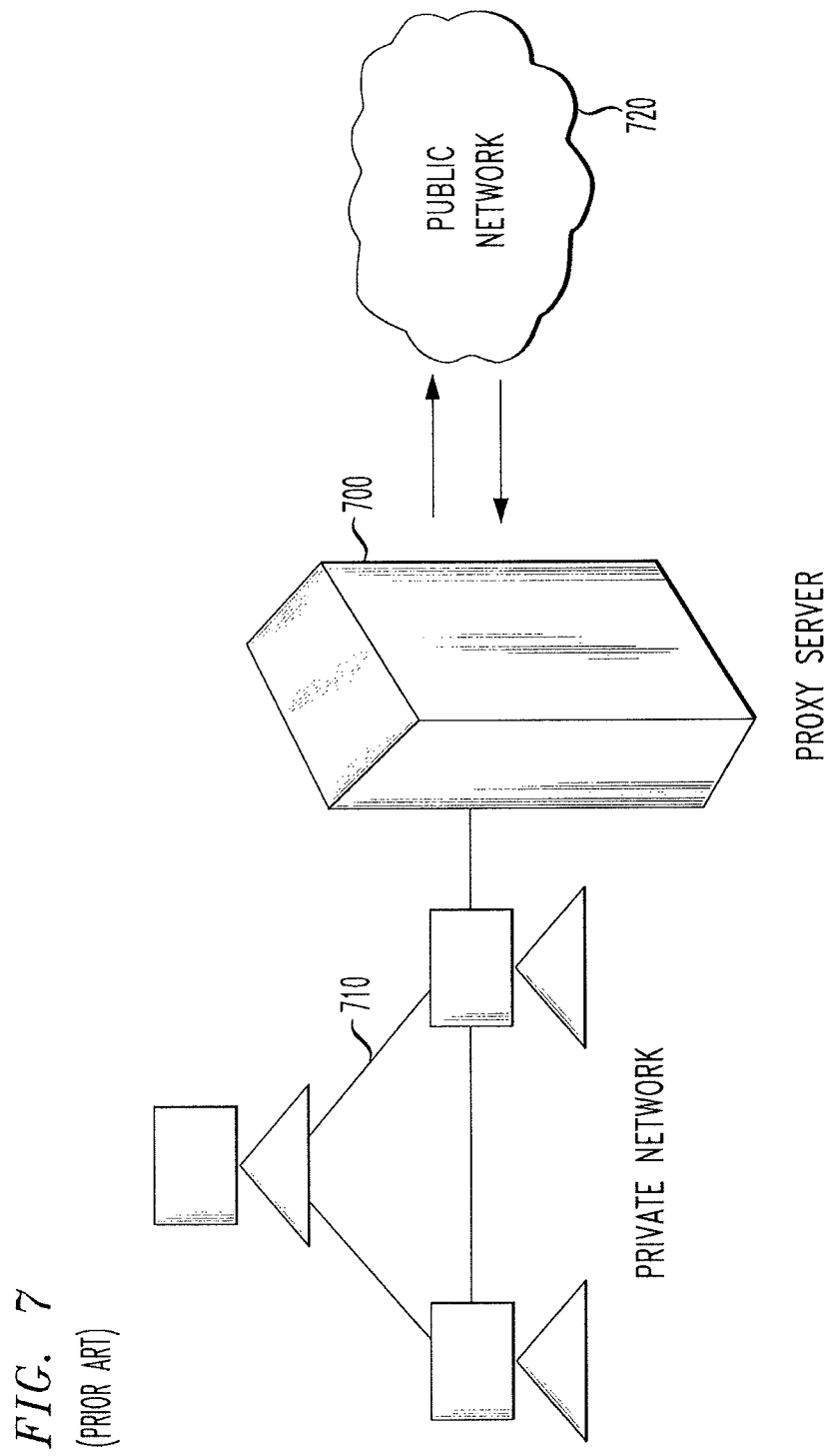
FIG. 7 depicts a conventional network topology incorporating a proxy server.

FIG. 3 illustrates an exemplary mobile IP location service flow using a mobile IP location server, in accordance with the principles of the present invention.

In step 300, a mobile device gains access to the Internet via an appropriate internet service provider. Internet service providers (e.g. Verizon Wireless, AT&T, etc.) conventionally administer IPv4 dynamic private IP addresses to mobile devices. Private IP addresses are not routable on the Internet. Thus, upon Internet access, the firewall on the device's serving network converts the device's private IP address to a public IP address, preferably via Network Address Translation (NAT).

In step 310, the mobile device 200 initiates a web service session 210 with a web service provider (e.g. an online banking service).

In step 320, the web service 210 that the mobile device 200 is accessing transmits an IP location request to the mobile IP location server 230, to attain location information for the requesting mobile device 200.

The web service 210 preferably transmits the IP location request 220 to the mobile IP location server 230 via a Live Communications Server (LCS) Client protocol over the mobile location protocol (MLP) Interface 120. The IP location request 220 preferably includes the mobile device's public IP address, port number, and any relevant application specific information (e.g. application type).

In step 330, the mobile IP location server 230 receives the transmitted IP location request 220, via the mobile location protocol (MLP) interface 120, and identifies the public IP address that is indicated within. The mobile IP location server 230 then determines the network operator that owns the public IP address received in the IP location request 220.

The owner of a public IP address is registered in the public domain. Therefore, the network/operator that an IP address belongs to may be determined via a database query to the IP address registry.

In an alternate embodiment, the mobile IP location server 230 maintains an IP address database for each mobile operator that the mobile IP location server 230 is serving. An inherent IP address database permits fast and accurate address lookup.

In yet another embodiment, a commercial provider company inserts network operator information into IP location requests sent to the mobile IP location server 230.

In step 340, address conversion is performed to accurately identify the mobile device 200 that corresponds to the public IP address indicated in the received IP location request 220. In particular, the identifier resolver converts the public IP address (e.g. IPv4) received for the mobile device 200 to a corresponding private IP address or real mobile identifier, e.g., IMSI, MSISDN, etc. Several mechanisms may be used to achieve this conversion.

One address conversion tactic the identifier resolver 110 may perform incorporates Network Address Translation (NAT). With authorization, the identifier resolver 110 may access a Network Address Translation (NAT) enabled device (e.g. a firewall at the proxy server 250) on the relevant device's serving network. The identifier resolver 110 may then initiate a request to query the Network Address Translation (NAT) table for the real mobile identifier of the mobile device 200, as documented in the NAT binding. The mobile identifier of the mobile device 200 is preferably returned in one of the following formats: MSISDN, IMSI, MSN, MIN, MDN, and/or a private IP address assigned to the mobile device 200.

Alternatively, the identifier resolver 110 may retrieve the mobile identifier and/or private IP address of the mobile device 200 by interacting with an HTTP proxy server 250 deployed on the mobile device's serving network.

An HTTP proxy server 250 on a network may insert a proprietary header in to each IP packet that is routed through the HTTP proxy server 250. The supplemental proprietary header may encompass an identifier that represents a transmitted IP packet's originating mobile device 200. However, to preserve user privacy, a device's true mobile identifier (e.g. IMSI, MSISDN, etc.) need not be used. Rather, a proxy server may maintain a database that maps identifiers inserted in a proprietary header to the real mobile identifiers (e.g. IMSI, MSISDN, etc.) they are being used to represent.

If this method is available, the identifier in a proprietary header should also be supplied in an IP location request 220 sent to the mobile IP location server 230. The identifier resolver 110 may then interact with the HTTP proxy server 250 to query the proxy server's database for a real mobile identifier of the mobile device 200, using the identifier supplied in a received IP location request 220.

As shown in step 350, address conversion performed by the identifier resolver 110 results in a mobile device's real mobile identifier (e.g. MSISDN, IMSI, MSN, MIN, and/or MDN) or a corresponding private IP address.

If address conversion yields a private IP address, then the retrieved private IP address must be converted to a real mobile identifier (step 360) before location services may be applied.

To convert a private IP address to a real mobile identifier (e.g. IMSI, MSISDN, etc.), the identifier resolver 110 determines the serving gateway that owns the relevant private IP address. The identifier resolver 110 may then retrieve the mobile identifier (e.g. IMSI, MSISDN, etc.) and current serving node (e.g. SGSN, MME, etc.) affiliated with the private IP address, from the serving gateway or Packet Data Network (PDN) gateway 242 that is serving the mobile device 200.

The PDN gateway 242 may either belong to a mobile operator or reside in an enterprise (e.g. Blackberry™ by Research in Motion uses IP addresses assigned by the enterprise where the RIM server is hosted).

When IPv6 is used, a private IP address assigned to a mobile device may be the same address used to access the internet. Thus, address conversion is not necessary in an IPv6 implementation.

In step 370, once the mobile IP location server 230 retrieves the real mobile identifier of the mobile device 200 and serving node address (optional), the location manager 130 requests the location of the mobile device 200 via standard location procedures (e.g. MPC, SUPL SLP, or GMLC). A location request 220 incorporating the real mobile identifier of the mobile device 200 and optional serving node address, is transmitted to the location manager 130 over the mobile location protocol (MLP) interface 120.

In step 380, the location manager 130 transmits a geographic location for the mobile device 200 to the mobile IP location server 230, over the mobile location protocol (MLP) interface 120. The mobile IP location server 230 subsequently returns the retrieved location information to the web service 210 that transmitted the IP location request 220.

It is preferred that the mobile IP location server 230 cache the results of a location request. Caching may be performed by assigning a key to location results to use in location rebids. A cached location may be configured with a stale age, in accordance with the principles of the present invention. Once a cached location expires based on stale age, the cached location is deleted and the expired location key results in error.

Mobile IP location services may potentially conflict with a subscriber's privacy settings. However, despite location privacy configurations, the present invention may still perform emergency location services and conventional commercial location requests.

If an emergency IP location request (i.e. EME_LIR) for a mobile device with location privacy is transmitted to the mobile IP location server 230, the mobile IP location server 230 may override privacy configurations. The mobile IP location server 230 may return precise location information to the requesting web application 210, along with the civic location of the serving Cell-ID of the mobile device 200.

Alternatively, if a commercial IP location request 220 for a mobile device 200 with location privacy is transmitted to the mobile IP location server 230, the mobile IP location server 230 may provide only city level location information derived from the serving Cell-ID of the mobile device 200.

In an alternate embodiment, the mobile IP location server 230 may transmit a subscriber privacy notification to the mobile device 200 whenever the web service 210 requests location of the mobile device 200 via an IP location request 220.

The present invention preferably utilizes existing location services (e.g. 3GPP Control Plane based via GMLC, etc., OMA User Plane based via SUPL SLP, or MPC for 3GPP2).

The present invention may be used in conjunction with the following wireless access technology: 3GPP based packet data using GERAN, UTRAN, or E-UTRAN radio access, Wireless LAN based on IEEE 802.11x, Wireless Personal Area Network Based on IEEE 802.15, Worldwide Interoperability for Microwave Access or Wireless metropolitan area network based on IEEE 802.16, 2GPP2 packet data access technologies (e.g. 1xEVDO based), Packet Data Access over Satellite, and high packet data access over speed point-to-point optical link (e.g. based on 802.17). Moreover, the present invention is applicable to other network types (e.g. CDMA2000 1X network).

The present invention has particular applicability to localized web content, location orient advertising, local weather applications, automatic product configuration, fraud detection or prevention, user authentication, law enforcement applications, and digital rights management (e.g. digital rights of video and/or audio on demand).

While the invention has been described with reference to the exemplary embodiments thereof, those skilled in the art will be able to make various modifications to the described embodiments of the invention without departing from the true spirit and scope of the invention.

What is claimed is:

1. A mobile Internet protocol (IP) location server, comprising:
 a mobile location protocol interface to receive an IP location request for geographic location information associated with a given mobile device identified only with a public Internet Protocol (IP) address included with said IP location request, said IP location request including application specific information;
 an identifier resolver to determine a real mobile identifier of said given mobile device from said public Internet protocol (IP) address included with said IP location request; and
 a location manager to obtain said geographic location information based on said real mobile identifier of said given mobile device and said application specific information included with said IP location request.

2. The mobile Internet protocol (IP) location server according to claim 1, wherein:
 said geographic location information associated with said given mobile device is current location information of said given mobile device.

3. The mobile Internet protocol (IP) location server according to claim 1, wherein said real mobile identifier comprises: IMSI.

4. The mobile Internet protocol (IP) location server according to claim 1, wherein said real mobile identifier comprises: MSISDN.

5. The mobile Internet protocol (IP) location server according to claim 1, wherein:
 said identifier resolver determines said real mobile identifier by querying a network address translation (NAT) enabled device.

6. The mobile Internet protocol (IP) location server according to claim 1, wherein:
 said identifier resolver determines said real mobile identifier by querying an HTTP proxy server configured on a serving network of said given mobile device.

7. A method of providing location for a mobile device identified in an IP location request without a mobile identifier, comprising:
 receiving an Internet protocol (IP) location request for geographic location information associated with a given mobile device identified only with a public Internet Protocol (IP) address included with said IP location request, said IP location request including application specific information;
 resolving a real mobile identifier of said given mobile device from said public IP address included with said IP location request;
 obtaining said geographic location information based on said real mobile identifier of said given mobile device and said application specific information included with said IP location request; and
 returning said obtained geographic location information to a requesting device initiating said IP location request.

8. The method of providing location for a mobile device identified in an IP location request without a mobile identifier according to claim 7, wherein:
 said obtained geographic location is returned to said requesting device via IP protocol.

9. The method of providing location for a mobile device identified in an IP location request without a mobile identifier according to claim 7, wherein:
 said geographic location information associated with said given mobile device is current location information of said given mobile device.

10. The method of providing location for a mobile device identified in an IP location request without a mobile identifier according to claim 7, wherein: said requesting device is a server hosting a web application.

11. The method of providing location for a mobile device identified in an IP location request without a mobile identifier according to claim 7, wherein said real mobile identifier comprises: IMSI.

12. The method of providing location for a mobile device identified in an IP location request without a mobile identifier according to claim 7, wherein said real mobile identifier comprises: MSISDN.

13. The method of providing location for a mobile device identified in an IP location request without a mobile identifier according to claim 7, wherein:
 said real mobile identifier is resolved by querying a network address translation (NAT) enabled device.

14. The method of providing location for a mobile device identified in an IP location request without a mobile identifier according to claim 7, wherein:
 said real mobile identifier is resolved by querying an HTTP proxy server configured on a serving network of said given mobile device.

15. Apparatus for providing location for a mobile device identified in an IP location request without a mobile identifier, comprising:
 means for receiving an Internet protocol (IP) location request for geographic location information associated with a given mobile device identified only with a public Internet Protocol (IP) address included with said IP location request, said IP location request including application specific information;
 means for resolving a real mobile identifier of said given mobile device from said public IP address included with said IP location request;
 means for obtaining said geographic location information based on said real mobile identifier of said given mobile device and said application specific information included with said IP location request; and
 means for returning said obtained geographic location information to a requesting device initiating said IP location request.

16. The apparatus for providing location for a mobile device identified in an IP location request without a mobile identifier according to claim 15, wherein:
 said means for obtaining said geographic location returns said geographic location to said requesting device via IP protocol.

17. The apparatus for providing location for a mobile device identified in an IP location request without a mobile identifier according to claim 15, wherein:
   said geographic location information associated with said given mobile device is current location information of said given mobile device.

18. The apparatus for providing location for a mobile device identified in an IP location request without a mobile identifier according to claim 15, wherein:
   said requesting device is a server hosting a web application.

19. The apparatus for providing location for a mobile device identified in an IP location request without a mobile identifier according to claim 15, wherein said real mobile identifier comprises: IMSI.

20. The apparatus for providing location for a mobile device identified in an IP location request without a mobile identifier according to claim 15, wherein said real mobile identifier comprises: MSISDN.

21. The apparatus for providing location for a mobile device identified in an IP location request without a mobile identifier according to claim 15, wherein:
   said means for resolving resolves said real mobile identifier by querying a network address translation (NAT) enabled device.

22. The apparatus for providing location for a mobile device identified in an IP location request without a mobile identifier according to claim 15, wherein:
   said means for resolving resolves said real mobile identifier by querying an HTTP proxy server configured on a serving network of said given mobile device.

* * * * *